Figure 1:
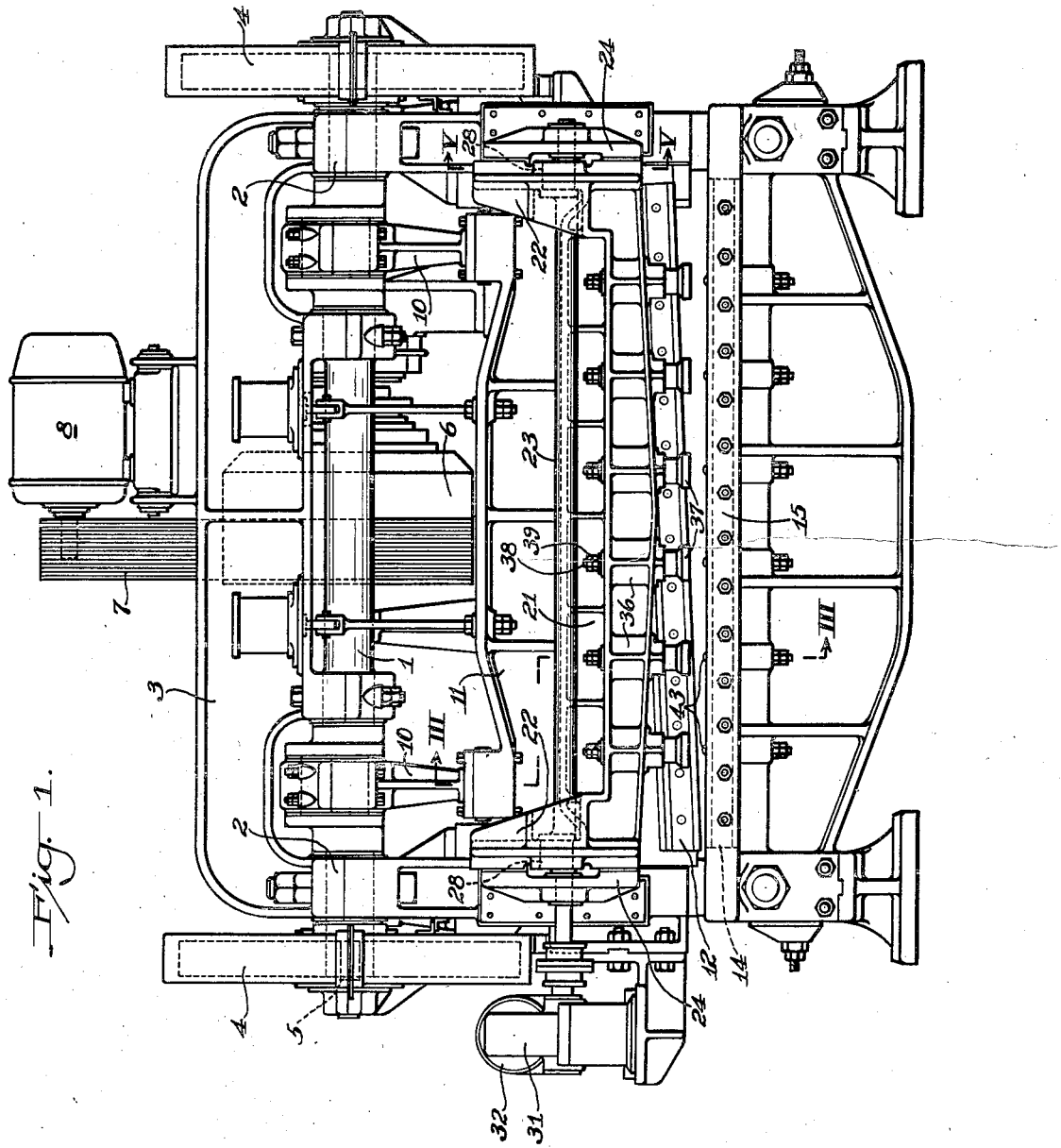

March 23, 1943.   W. R. DUDA   2,314,645
HOLD-DOWN DEVICE
Filed Oct. 4, 1941   3 Sheets—Sheet 1

WITNESSES.
A B Wallace.
V. A. Peckham.

INVENTOR.
Wentzel R. Duda
BY Brown, Critchlow & Flick
his ATTORNEYS

March 23, 1943.  W. R. DUDA  2,314,645
HOLD-DOWN DEVICE
Filed Oct. 4, 1941  3 Sheets-Sheet 2

WITNESSES.
O B Wallace
V. A. Peckham.

INVENTOR.
Wentzel R. Duda
BY Brown, Critchlow & Rick
his ATTORNEYS.

March 23, 1943.   W. R. DUDA   2,314,645
HOLD-DOWN DEVICE
Filed Oct. 4, 1941    3 Sheets-Sheet 3

Patented Mar. 23, 1943

2,314,645

UNITED STATES PATENT OFFICE 2,314,645

HOLD-DOWN DEVICE

Wentzel R. Duda, Mount Lebanon, Pa.

Application October 4, 1941, Serial No. 413,681

1 Claim. (Cl. 164—55)

This invention relates to gags or hold-down devices for use with metal working machines, such, for example, as plate shears and drilling and punching machines.

In general practice, particularly that of shearing large steel plates, hold-down devices are necessary in order to hold the plates in correct position while the shearing is being performed. At one time it was customary to use a long hold-down member which was pressed against the plate to be cut by cams connected to the crankshaft of the shear. The hold-down or gag was arranged to contact the material before the cutting operation was started, this being accomplished by advancing the cams so that the gag engaged the material before the movable upper blade of the shear and then returned to its original position on the upward stroke of the shear blade. This method of operation was found to be unsatisfactory due to the fact that shears of this type are usually made to make one cycle and stop by the operation of a mechanical clutch through a drive provided with flywheels. Because of this type of construction the shear blade can not be stopped, after it has been started in motion, until it has completed its cycle. Inasmuch as the gag depended for its operation upon the movement of the shear blade, it also performed its cycle to completion before it came to rest. This was found to be quite a handicap because the material to be sheared often moved when engaged by the gag, and, since the shear blade followed immediately, quite often the cut was not made along the desired line.

To eliminate this difficulty gags have been developed which operate independently of the shear blade so that they can be lowered and the plates lined up, and if the position of the plates is not satisfactory the gags can be raised again so that the plates can be relocated, whereupon the gags are again lowered to hold-down position. However, these gags are hydraulically or pneumatically operated. The pneumatic gags generally are not of sufficient capacity because the necessary high pressures are not available, and the large diameter cylinders that are necessary obstruct the view of the operator in sighting the cutting lines on the plates. Hydraulic gags are unsatisfactory because there is always a certain amount of oil leakage present. Oil is detrimental to the plates being cut and must be removed before they can be galvanized. This is a costly process.

It is among the objects of this invention to provide a gag for metal working machines that is operated independently of the machine drive, that does not deposit oil on the plates being worked upon, that does not obstruct the operator's view of the positioning lines, that securely holds plates down in position even though they do not have flat surfaces or upper surfaces parallel to the table that supports them, and that automatically holds thicker plates with greater pressure than thinner ones.

In accordance with this invention a vertically reciprocable crosshead is mounted above a table on which plates are supported while they are being worked upon by a machine, and means is provided for lowering and raising the crosshead independently of the machine drive. For pressing a plate down on the table the crosshead carries a plurality of spring-biased hold-down members, preferably in the form of plungers projecting from the bottom of the crosshead with springs resisting upward movement of the plungers. To facilitate lining up plates with the operating tools of the machine the table is provided with a plurality of vertical openings. Anti-friction members are disposed in these openings and normally project above the table for carrying the plate. The anti-friction members are supported by downwardly yielding means so that when the hold-down members are pressed down on the plate the latter presses the anti-friction members downwardly until the plate rests flat on the table.

Figure 2:
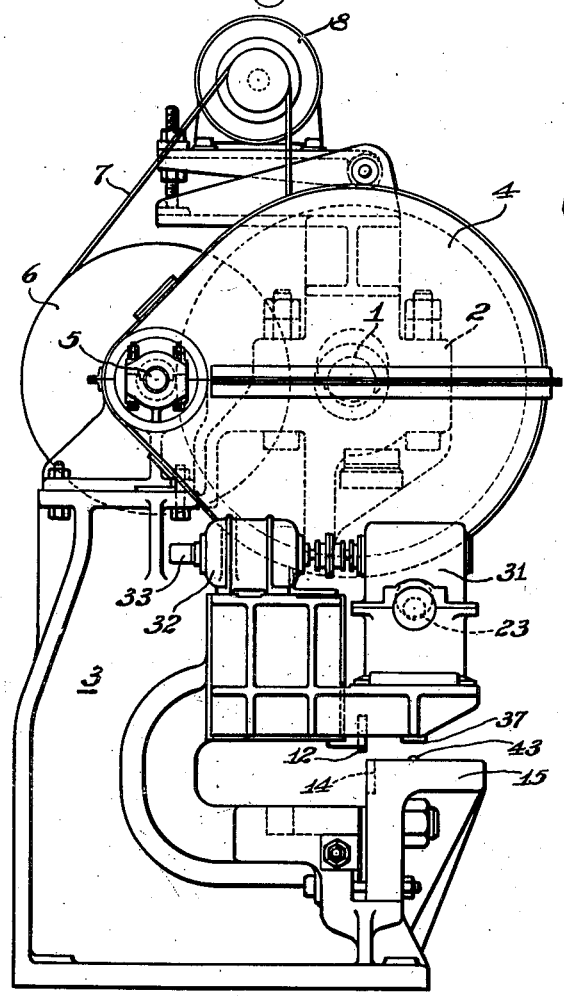
Figure 3:
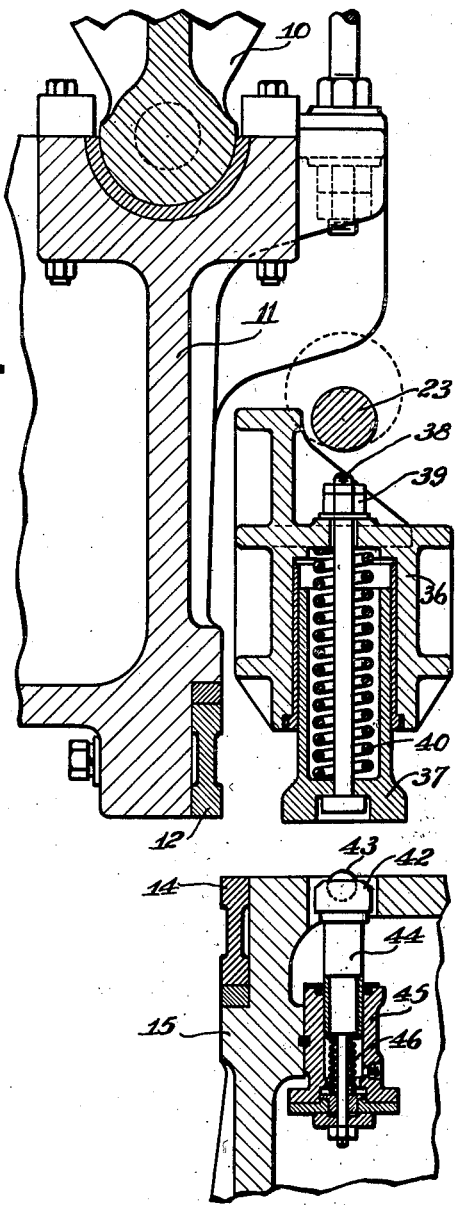
Figure 4:
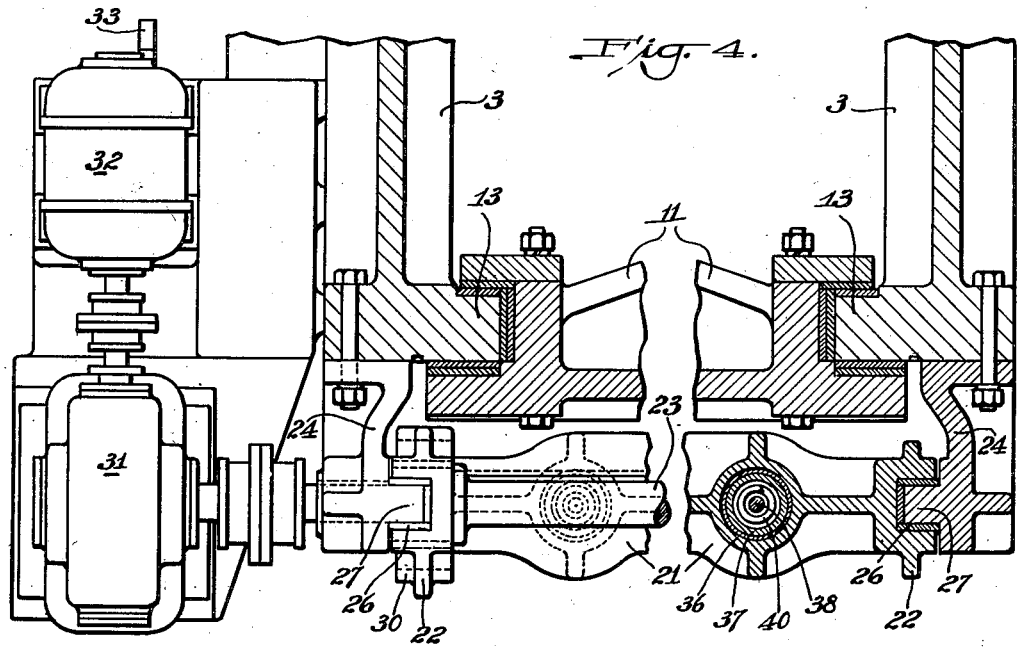
Figure 5:
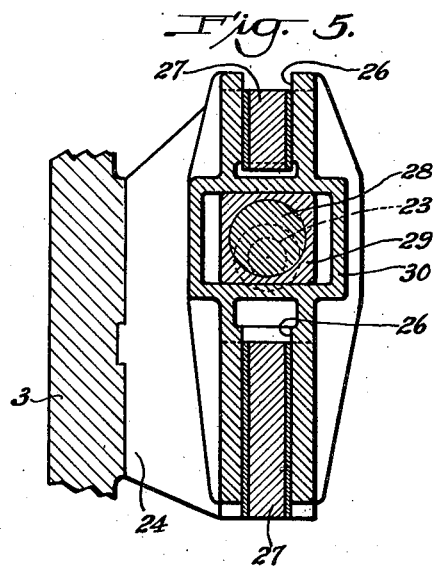

The preferred embodiment of the invention is illustrated in the accompanying drawings in which Fig. 1 is a side view of a plate shear equipped with my gag; Fig. 2 is an end view thereof; Fig. 3 is an enlarged fragmentary vertical section taken on the line III—III of Fig. 1; Fig. 4 is an enlarged fragmentary plan view of the gag partly in horizontal section; and Fig. 5 is an enlarged fragmentary vertical section of one end of the crosshead and its guide taken on the line V—V of Fig. 1.

Referring to Figs. 1, 2, and 3 of the drawings, a horizontal crankshaft 1 is journaled in bearings 2 at the opposite ends of a shear frame 3, and is driven from its projecting ends through gear reduction units 4 from a main drive shaft 5 (Fig. 2) parallel to the crankshaft. Mounted on the center of the drive shaft is a pulley 6 that is driven by belts 7 from an electric motor 8 mounted on top of the shear frame. This motor is controlled in the usual manner by manually operated switches (not shown). The crankshaft carries crank arms 10 that are pivotally connected at their lower ends to the top of a beam 11 to the lower edge of which the movable blade 12 of the shear is rigidly secured. This beam is guided in its vertical movements by suitable guides 13 (Fig. 4) at the ends of the frame. The lower blade 14 (Figs. 2 and 3) which is stationary, is mounted along the inner edge of a horizontal table 15 attached to the shear frame and on which the plates are supported while being sheared.

It is a feature of this invention that improved means is provided for holding metal plates down on table 15 in a manner more satisfactory than heretofore while they are being sheared. Accordingly, a crosshead 21 is disposed in front of and parallel to the reciprocable beam 11. The crosshead has upwardly extending end portions 22 in which a horizontal camshaft 23 is journaled. The ends of this shaft extend beyond the crosshead and are journaled in guide brackets 24 connected to the ends of the shear frame, from which it will be seen that the crosshead is supported by shaft 23. As shown in Figs. 4 and 5, the ends of the crosshead are provided with vertical slots 26 that slidingly receive vertical ribs 27 integral with guide brackets 24 whereby to guide the crosshead as it is reciprocated vertically in the following manner. The portions of the camshaft disposed in the ends of the crosshead are provided with eccentrics or cams 28 (Fig. 5) journaled in blocks 29 that are slidable horizontally in box-like bearings 30 in the crosshead ends 22. The camshaft is driven through a gear reduction unit 31 from an electric motor 32 attached to the shear frame, and as the shaft rotates, its eccentrics 28 cause blocks 29 to move the crosshead up and down. The operation of this motor is entirely independent of motor 8 that drives the shear. It is started by any suitable manually operable switch (not shown), but is provided with an automatic limit switch 33 which stops it after it has rotated the camshaft 180 degrees. The limit switch is arranged to stop the shaft when the crosshead is in either its lowermost or uppermost position.

In order to hold plates down on table 15, crosshead 21 is provided at longitudinally spaced intervals with downwardly opening cylinders 36 in each of which a hollow plunger 37 is slidably mounted, as best shown in Fig. 3. The lower end of each plunger projects below the crosshead and is adapted to engage a plate supported on the table. Extending up through each plunger from its lower end is a bolt 38 that also extends through a hole in the crosshead in which it is slidable vertically. Nuts 39 are threaded on the upper ends of the bolts so as to hold the plungers in the cylinders. As the crosshead moves down to the same lower position every time it is lowered, provision must be made for accommodating plates of different or non-uniform thicknesses. This is done, in accordance with this invention, by compressing springs in the crosshead cylinders so that the plungers normally are held as far down away from the tops of the cylinders as bolts 38 will permit. These springs are preferably in the form of coil springs 40 encircling the bolts in the hollow plungers and compressed between the lower ends of the plungers and the upper ends of the cylinders. The springs are strong enough to cause the plungers, when the crosshead is lowered, to engage with the desired pressure the thinnest plates that will be sheared. When thicker plates are sheared, the plungers are forced up into the cylinders and the springs are thus compressed still more which increases the pressure of the plungers on the plates. This is very desirable because more pressure is required to hold heavy thick plates in position than light thin plates. It will be obvious that the plungers will accommodate themselves to plates having uneven upper surfaces or upper surfaces that are not parallel to the top of table 15, in which cases some of the plungers are forced up into the crosshead farther than others.

It is difficult to slide large heavy plates around on the table 15 so as to line up the cutting line with the shear blades. Another feature of this invention is that this manipulation of the plates is facilitated by providing the table with a plurality of projecting anti-friction members for supporting plates while they are being moved into correct cutting positions. Accordingly, as shown in Fig. 3, the table is provided with a plurality of vertical openings 42 therethrough in each of which there is an anti-friction member, such as a steel ball 43, that projects a short distance above the upper surface of the table. Each ball is rotatably mounted in a socket in the upper end of a plunger 44 that is vertically movable in a cylinder 45 mounted below table 15. These plungers are normally held in their upper positions with the balls projecting above the table by means of coil springs 46 compressed between the lower ends of the plungers and the bottom walls of the cylinders. These springs are strong enough to keep the balls projecting above the table while they are supporting a plate that is being lined up with the shear blades, but when crosshead 21 is lowered the stronger springs 40 carried by it cause the upper plungers 37 to press the plate down hard enough to force the balls down into the table so that the plate rests flat upon it during the actual shearing operation.

According to the provisions of the patent statutes, I have explained the principle and mode of operation of my invention, and have illustrated and described what I now consider to represent its best embodiment. However, I desire to have it understood that, within the scope of the appended claim, the invention may be practiced otherwise than as specifically illustrated and described.

I claim:

A gag for use with a metal working machine having a support for a plate being worked upon, said gag comprising a vertically reciprocable crosshead adapted to be mounted above the support, guides for the crosshead, a camshaft journaled in said guides and operatively connected to the crosshead for reciprocating it, a motor for driving the camshaft independently of the machine drive, and a plurality of spring-biased holddown members carried by the crosshead and projecting below it for pressing a plate down on said support when the crosshead is lowered.

WENTZEL R. DUDA.